United States Patent

Duran, Sr.

[11] Patent Number: 5,868,016
[45] Date of Patent: Feb. 9, 1999

[54] VEHICULAR ANTI-THEFT DEVICE

[76] Inventor: Thomas R. Duran, Sr., 8315 E. 5th St. #101, Downey, Calif. 90241

[21] Appl. No.: 961,508

[22] Filed: Oct. 30, 1997

[51] Int. Cl.⁶ .................................................. B60R 25/02
[52] U.S. Cl. ............................................... 70/209; 70/226
[58] Field of Search ............................ 70/207, 209, 211, 70/212, 225, 226, 237, 238

[56] References Cited

U.S. PATENT DOCUMENTS

| | | | |
|---|---|---|---|
| 1,154,389 | 9/1915 | Fogalsang | 70/209 |
| 1,329,913 | 2/1920 | McGuire | 70/209 |
| 1,395,532 | 11/1921 | Tilden | 70/209 |
| 1,766,784 | 6/1930 | Gregory | 70/43 |
| 5,353,614 | 10/1994 | Anderson | 70/211 X |
| 5,450,736 | 9/1995 | Volkmar | 70/209 |
| 5,540,067 | 7/1996 | Kim | 70/226 X |
| 5,555,754 | 9/1996 | Ferrante | 70/209 |
| 5,595,078 | 1/1997 | Harrell | 70/209 |
| 5,613,383 | 3/1997 | Banez | 70/226 X |
| 5,613,384 | 3/1997 | Weber et al. | 70/209 |
| 5,619,873 | 4/1997 | Wood | 70/209 |
| 5,666,832 | 9/1997 | Cunningham | 70/209 |
| 5,706,681 | 1/1998 | Gorokhovsky | 70/209 |

FOREIGN PATENT DOCUMENTS 2263455  7/1993  United Kingdom .................... 70/209

*Primary Examiner*—Lloyd A. Gall

[57] ABSTRACT

A vehicular anti-theft device is provided including a steering wheel having a central portion coupled to a steering column and an outer annular portion coupled in concentric relationship with the central portion. A security mechanism is provided for encompassing the outer annular portion of the steering wheel. Next provided is a gripping arm fixed with respect to the security mechanism for precluding the rotation of the steering wheel.

5 Claims, 2 Drawing Sheets

VEHICULAR ANTI-THEFT DEVICE

BACKGROUND OF THE INVENTION

1. Field of the Invention

The present invention relates to steering wheel mounted anti-theft devices and more particularly pertains to a new vehicular anti-theft device for preventing the severing of a steering wheel thereby precluding the removal of a steering wheel-mounted anti-theft device.

2. Description of the Prior Art

The use of steering wheel-mounted anti-theft device is known in the prior art. More specifically, steering wheel-mounted anti-theft devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art steering wheel mounted anti-theft devices include U.S. Pat. No. 5,275,030; U.S. Pat. No. 5,381,679; U.S. Patent Des. 316,025; U.S. Pat. No. 5,299,438; U.S. Pat. No. 5,180,029; and U.S. Pat. No. 5,115,652.

In these respects, the vehicular anti-theft device according to the present invention substantially departs from the conventional concepts and designs of the prior art, and in so doing provides an apparatus primarily developed for the purpose of preventing the severing of a steering wheel and further precluding the removal of an airbag.

SUMMARY OF THE INVENTION

In view of the foregoing disadvantages inherent in the known types of steering wheel mounted anti-theft devices now present in the prior art, the present invention provides a new vehicular anti-theft device construction wherein the same can he utilized for preventing the severing of a steering wheel and further precluding the removal of an airbag.

The general purpose of the present invention, which will be described subsequently in greater detail, is to provide a new vehicular anti-theft device apparatus and method which has many of the advantages of the steering wheel mounted anti-theft devices mentioned heretofore and many novel features that result in a new vehicular anti-theft device which is not anticipated, rendered obvious, suggested, or even implied by any of the prior art steering wheel mounted anti-theft devices, either alone or in any combination thereof.

To attain this, the present invention generally comprises a steering wheel having a central portion coupled to a steering column. The steering wheel further includes an outer annular portion coupled in concentric relationship with the central portion. Note FIG. 1. As an option, the central portion may have an air bag formed therein. Next provided is a first half including a front semi-circular face, a rear semi-circular face, and an arcuate periphery formed therebetween. An interior space is thus defined with an associated open side face with a rectangular configuration. As shown in FIG. 2, the rear face has a rectangular cut out formed therein in communication with the open side face. The periphery has a pair of arcuate tabs coupled thereto which extend past the open side face. As shown in FIG. 1, the first half includes a locking compartment with a rectangular front face and a periphery coupled between the front face of the compartment and the front semi-circular face of the first half. As such, an edge of the front face is in parallel with the open side face of the first half. The locking compartment further includes a pair of tabs extending therefrom in perpendicular relationship with the open side face. Each of such tabs have an elongated slot formed therein. The first half further has a cylindrical gripping arm coupled to the compartment which extends therefrom past the periphery thereof. For carrying purposes, the gripping arm has an elastomeric covering formed on an end thereof. Associated therewith is a second half with a front semi-circular face, a rear semi-circular face, and an arcuate periphery formed therebetween to define an interior space and an open side face with a rectangular configuration. Similar to the first half, the rear face of the second half has a rectangular cut out formed therein in communication with the open side face. The second half has a locking compartment including a rectangular front face. A periphery is coupled between the front face of the compartment and the front semi-circular face of the second half such that an edge of the front face is in parallel with the open side face of the second half. As shown in FIGS. 1 & 3, the locking compartment of the second half further includes a pair of rotating arms with an associated key portion extending from the front face of compartment. During use, the first half and the second half may be situated about the annular portion of the steering wheel such that the steering column resides within the rectangular cut outs. In such orientation, the rotating arms may be rotated by the insertion of a key within the key portion. This inserts the arms within the slots of the tabs to preclude the removal of the first and second half from the steering wheel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular anti-theft device apparatus and method which has many of the advantages of the steering wheel mounted anti-theft devices mentioned heretofore and many novel features that result in a new vehicular anti-theft device which is not anticipated, rendered obvious, suggested, or even implied by any of the prior art steering wheel mounted anti-theft devices, either alone or in any combination thereof.

It is another object of the present invention to provide a new vehicular anti-theft device which may be easily and efficiently manufactured and marketed.

It is a further object of the present invention to provide a new vehicular anti-theft device which is of a durable and reliable construction.

An even further object of the present invention is to provide a new vehicular anti-theft device which is susceptible of a low cost of manufacture with regard to both materials and labor, and which accordingly is then susceptible of low prices of sale to the consuming public, thereby making such vehicular anti-theft device economically available to the buying public.

Still yet another object of the present invention is to provide a new vehicular anti-theft device which provides in the apparatuses and methods of the prior art some of the advantages thereof, while simultaneously overcoming some of the disadvantages normally associated therewith.

Still another object of the present invention is to provide a new vehicular anti-theft device for preventing the severing of a steering wheel and further precluding the removal of an airbag.

Even still another object of the present invention is to provide a new vehicular anti-theft device that includes a steering wheel having a central portion coupled to a steering column and an outer annular portion coupled in concentric relationship with the central portion. A security mechanism is provided for encompassing the outer annular portion of the steering wheel. Next provided is a gripping arm fixed with respect to the security mechanism for precluding the rotation of the steering wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
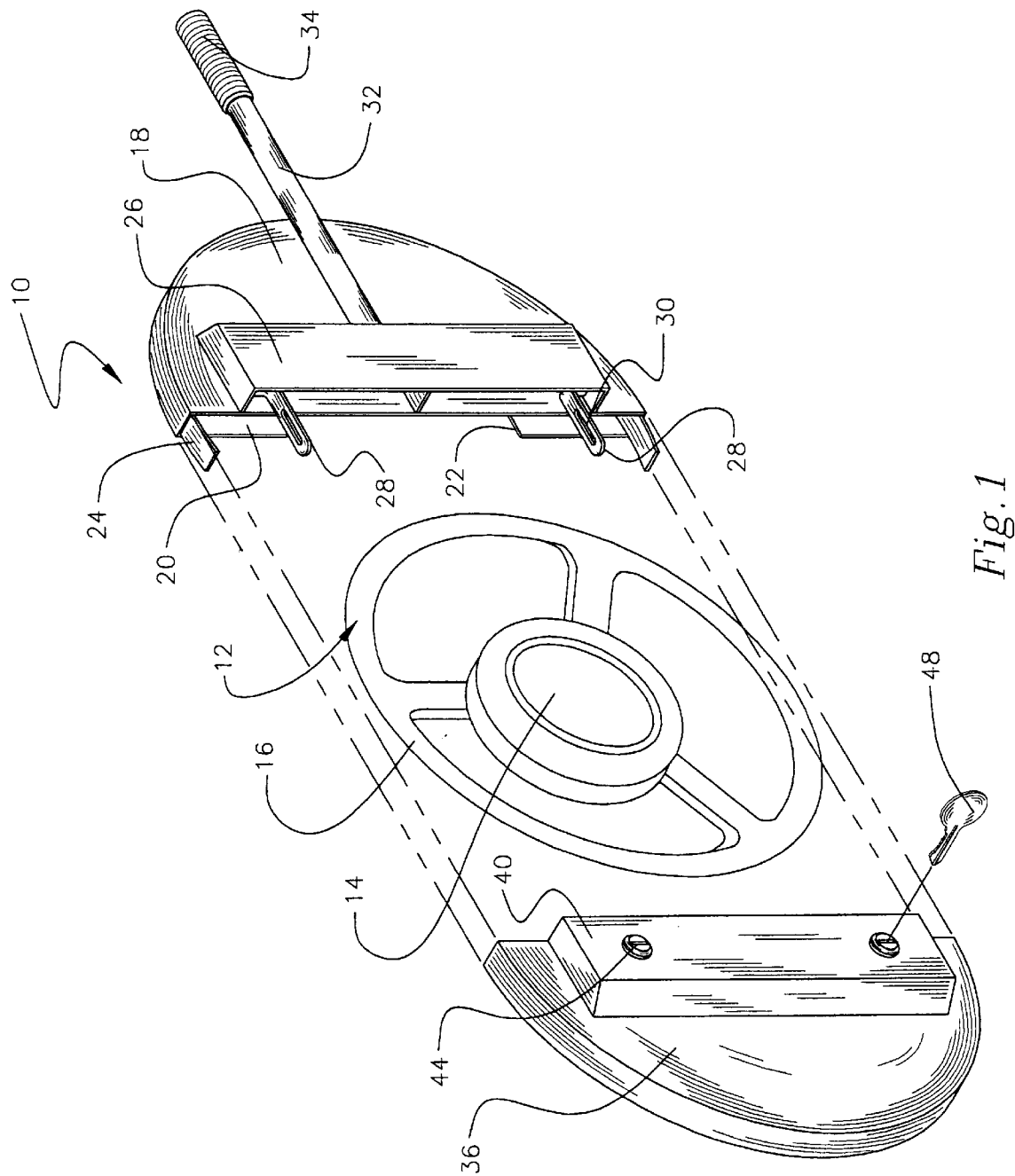
FIG. 1 is a perspective view of a new vehicular anti-theft device according to the present invention.
Figure 2:
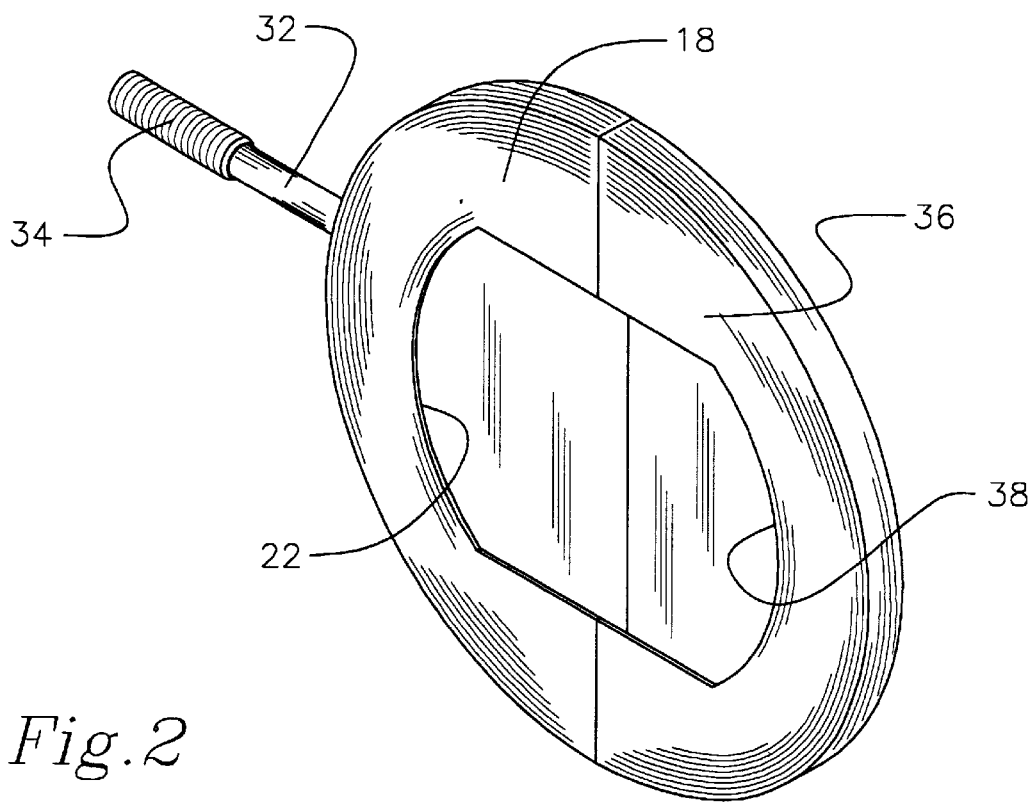
FIG. 2 is a rear view of the present invention.
Figure 3:
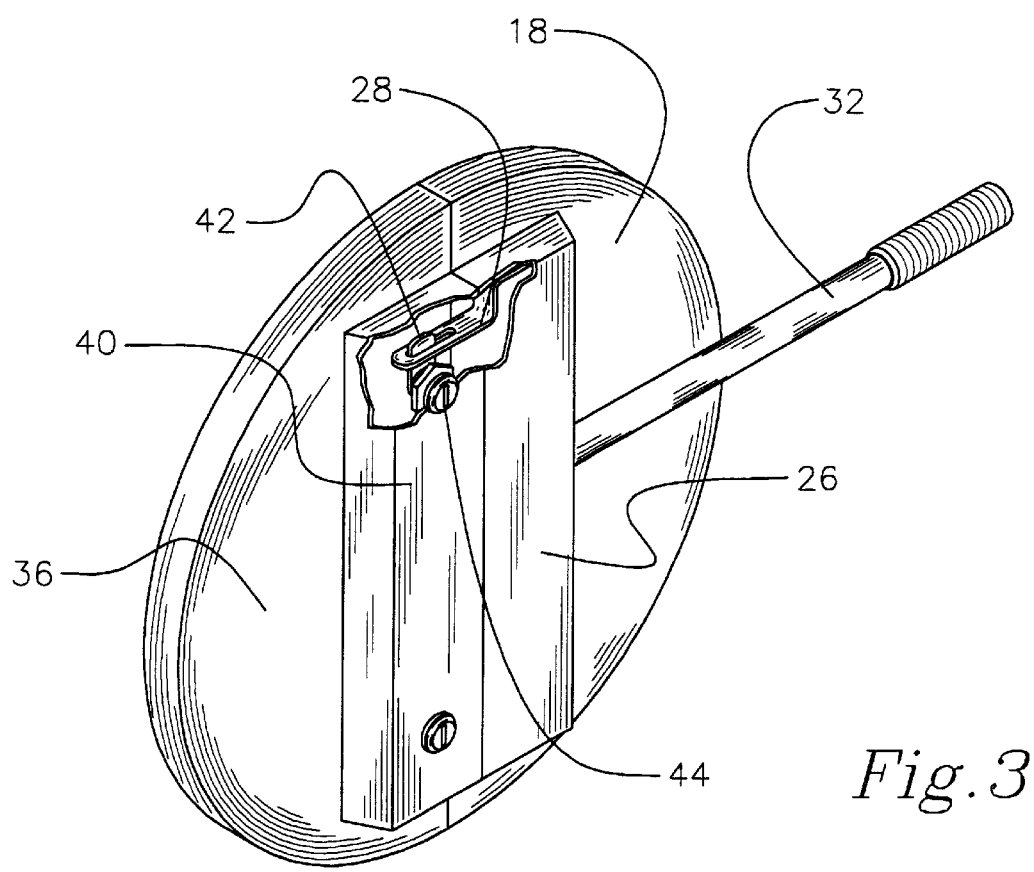
FIG. 3 is a front view of the present invention.

With reference now to the drawings, and in particular to FIGS. 1 through 3 thereof, a new vehicular anti-theft device embodying the principles and concepts of the present invention and generally designated by the reference numeral 10 will be described.

The present invention, as designated as numeral 10, includes a steering wheel 12 having a central portion 14 coupled to a steering column. The steering wheel further includes an outer annular portion 16 coupled in concentric relationship with the central portion. Note FIG. 1. As an option, the central portion may have an air bag formed therein.

Next provided is a first half 18 including a front semi-circular face, a rear semi-circular face, and an arcuate periphery formed therebetween. An interior space is thus defined with an associated open side face 20 having a rectangular configuration. As shown in FIG. 2, the rear face has a generally rectangular cut out 22 formed therein in communication with the open side face. The periphery has a pair of arcuate tabs 24 coupled thereto which extend past the open side face.

As shown in FIG. 1, the first half includes a locking compartment 26 with a rectangular front face and a periphery coupled between the front face of the compartment and the front semi-circular face of the first half. As shown, an edge of the front face is in parallel with the open side face of the first half. The locking compartment further includes a pair of tabs 28 extending therefrom in perpendicular relationship with the open side face. In the preferred embodiment, the tabs are positioned adjacent opposite ends of the compartment. Each of such tabs further have an elongated slot 30 formed therein.

The first half further has a cylindrical gripping arm 32 coupled to the periphery of the compartment and extending therefrom past the periphery of the first half and in perpendicular relationship with the open side face of the first half. For carrying purposes, the gripping arm has an elastomeric covering 34 formed on an end thereof.

Associated therewith is a second half 36 with a front semi-circular face, a rear semi-circular face, and an arcuate periphery formed therebetween to define an interior space and an open side face with a rectangular configuration. Similar to the first half, the rear face of the second half has a generally rectangular cut out 38 formed therein in communication with the open side face. The second half has a locking compartment 40 including a rectangular front face. A periphery is coupled between the front face of the compartment and the front semi-circular face of the second half such that an edge of the front face is in parallel with the open side face of the second half, similar to the first half.

As shown in FIGS. 1 & 3, the locking compartment of the second half further includes a pair of rotating arms 42 with an associated key portion 44 extending from the front face of compartment. During use, the rotating arms are adapted to rotate in the interior space of the compartment within a 90 degree range between a first orientation parallel with the open side face and a second orientation perpendicular with respect thereto.

During use, the first half and the second half may be situated about the annular portion of the steering wheel such that the steering column resides within the rectangular cut outs and the compartments join to form a single compartment. In Such orientation, the arcuate tabs of the first half engage an inner surface of the periphery of the second half. Further, the rotating arms may be rotated by the insertion of a key 48 within the key portion. This inserts the arms within the slots of the tabs to preclude the removal of the first and second half from the steering wheel.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular anti-theft device comprising, in combination:

a steering wheel having a central portion coupled to a steering column and an outer annular portion coupled in concentric relationship with the central portion, the central portion having an air bag formed therein;

a first half including a front semi-circular face, a rear semi-circular face, and an arcuate periphery formed therebetween to define an interior space and an open side face with a generally rectangular configuration, wherein the rear face has a generally rectangular cut out formed therein in communication with the open side face, the periphery having a pair of arcuate tabs coupled thereto and extending past the open side face, a locking compartment including a generally rectangular front face with a periphery coupled between the front face of the compartment and the front semi-circular face of the first half such that an edge of the front face is in parallel with the open side face of the first half, the locking compartment further including a pair of tabs extending therefrom in perpendicular relationship with the open side face with each tab having an elongated slot formed therein, the first half further having a cylindrical gripping arm coupled to the compartment and extending therefrom past the periphery of the first half, the gripping arm having an elastomeric covering formed on an end thereof; and a second half including a front semi-circular face, a rear semi-circular face, and an arcuate periphery formed therebetween to define an interior space and an open side face with a generally rectangular configuration, wherein the rear face has a generally rectangular cut out formed therein in communication with the open side face, the second half having a locking compartment including a generally rectangular front face with a periphery coupled between the front face of the compartment and the front semi-circular face of the second half such that an edge of the front face is in parallel with the open side face of the second half, the locking compartment further including a pair of rotating arms with an associated key portion extending from the front face of the compartment, whereby the first half and the second half may be situated about the annular portion of the steering wheel such that the steering column resides within the generally rectangular cut outs and the rotating arms may be rotated by the insertion of a key within the key portion thereby inserting the arms within the slots of the tabs to preclude the removal of the first and second half from the steering wheel.

2. A vehicular anti-theft device comprising:

a steering wheel having a central portion coupled to a steering column and an outer annular portion coupled in concentric relationship with the central portion;

a security means for encompassing the outer annular portion of the steering wheel, wherein the security means takes the form of a disk with a cut out formed therein for allowing the passage of the steering column therethrough; and a gripping arm fixed with respect to the security means for precluding the rotation of the steering wheel;

wherein the disk of the security means includes a pair of halves releasably coupled by way of a locking assembly including a pair of tabs extending from a first half of the disk in perpendicular relationship with an open side face of the first half with each tab having an elongated slot formed therein, the locking assembly further including a pair of rotating arms mounted on a second half of the disk each with an associated key portion mounted on a front face of the second half of the disk.

3. A vehicular anti-theft device as set forth in claim 2 wherein the gripping arm is fixed with respect to one of the halves.

4. A vehicular anti-theft device as set forth in claim 2 wherein the security means encompasses essentially an entire perimeter of the annular portion of the steering wheel.

5. A vehicular anti-theft device as set forth in claim 2 wherein the locking assembly resides within a compartment formed on the front face of the disk with the key portions extending from a front face of the compartment.

\* \* \* \* \*